United States Patent Office 3,567,772
Patented Mar. 2, 1971

3,567,772
PROCESS FOR THE PRODUCTION OF ACRYLIC ACID
Masaya Yanagita, Tokyo, and Masao Kitahara, Chiba-shi, Japan, assignors to Toa Gosei Chemical Industry Co. Ltd., and Rikagaku Kenkyusho, both of Tokyo, Japan
No Drawing. Filed Mar. 27, 1967, Ser. No. 625,940
Claims priority, application Japan, Mar. 30, 1966, 41/19,846
Int. Cl. C07c 51/26
U.S. Cl. 260—530                                    8 Claims

ABSTRACT OF THE DISCLOSURE

A high yield process for producing pure acrylic acid by the vapor phase oxidation of acrolein with molecular oxygen employing a highly active catalyst composition consisting of molybdenum, vanadium and aluminum oxides such as $MoO_3$, $V_2O_5$ and $Al_2O_3$ and at least one oxide of a metal such as Cu, Ge, U, Mn, Ba, Si, Au, Se, Co, Ti, Sr, Ag, Mg, B, Sn, W, Pb and As.

BRIEF DESCRIPTION OF THE INVENTION

The present invention relates to a process for the production of acrylic acid by the catalytic vapor-phase oxidation of acrolein and more particularly it relates to a high yield process for the production of pure acrylic acid by the vapor phase oxidation of acrolein in the presence of an improved catalyst.

This invention provides a very profitable route for the oxidation of acrolein, a process which heretofore has been comparatively difficult to achieve economically. The fact that acrylic acid is obtained with a good yield by the vapor phase oxidation of acrolein according to the present invention means that acrylic acid can be obtained directly from propylene in a two-step process using two kinds of catalysts. This enables the omission of a complicated step of collecting intermediate acrolein and enables the separation of acrylic acid directly from the reaction product gases by a comparatively simple method such as cooling or water-washing, thereby producing acrylic acid industrially and cheaply.

DETAILED DESCRIPTION OF THE INVENTION

The invention will now be explained in detail utilizing $MoO_3$—$V_2O_5$—$Al_2O_3$—CuO type catalysts.

By using an aluminum sponge of 6–10 meshes as a carrier and a basic composition of $MoO_3$, $V_2O_5$ and $Al_2O_3$ in a ratio of 100:10:3, various catalysts were prepared while incorporating into the basic composition various amounts of copper oxide (CuO). Using thus prepared catalysts, acrylic acid was produced from acrolein employing 3.8 mol. percent of acrolein, 1.25 mol ratio of oxygen to acrolein, 10.0 mol ratio of water to acrolein and 1000 hr.$^{-1}$ space velocity (S.V.). The results are shown in Table 1.

TABLE 1

| $MoO_3$:$V_2O_5$:$Al_2O_3$:CuO (weight ratio) | (A) | (B) | (C) | (D) |
|---|---|---|---|---|
| 100:0:0:0 | 360 | 14.5 | 2.8 | ----- |
| 100:10:0:0 | 310 | 94.3 | 65.5 | 93.0 |
| 100:10:0:5 | 310 | 93.8 | 67.2 | 92.2 |
| 100:10:3:0 | 300 | 97.3 | 85.7 | 95.4 |
| 100:10:3:1 | 300 | 94.5 | 86.2 | 97.0 |
| 100:10:3:3 | 300 | 96.3 | 89.1 | 97.0 |
| 100:10:3:5 | 300 | 98.6 | 93.8 | 97.8 |
| 100:10:3:7 | 300 | 99.4 | 97.0 | 98.5 |
| 100:10:3:10 | 300 | 98.4 | 96.0 | 97.6 |
| 100:10:3:20 | 290 | 96.6 | 95.0 | 97.0 |
| 100:10:3:30 | 290 | 95.0 | 90.8 | 97.0 |
| 100:10:3:50 | 290 | 95.0 | 87.1 | 95.5 |
| 100:5:5:5 | 300 | 97.2 | 91.1 | 98.4 |
| 100:100:10:10 | 275 | 98.7 | 92.8 | 96.4 |
| 100:300:20:10 | 250 | 97.9 | 73.0 | 95.1 |

NOTE:
(A) Reaction temperature, ° C.
(B) Conversion of acrolein, percent.
(C) Yield for acrylic acid, percent.
(D) Purity of acrylic acid, percent.

As shown in the above table, the catalyst consisting of only $MoO_3$ shows almost no catalyatic activity. Although the catalyst consisting of $MoO_3$ and $V_2O_5$ has considerable catalytic activity, it is insufficient for practical use. The activity of the catalyst for producing acrylic acid is increased by the addition of $Al_1O_2$. By adding CuO thereto, the activity of the catalyst for the selective formation of acrylic acid is increased still more and simultaneously the yield of acrylic acid and the purity of thus produced acrylic acid reach the optimum values. Heretofore, acrylic acid could not be produced with such a good yield and high purity. The proportion of the CuO component may be varied within a range of 1–50%, preferably 3–20% by weight to the amount of $MoO_3$ in the catalyst. That is, it is suitable to use a catalyst containing $MoO_3$, $V_2O_5$, $Al_2O_3$ and CuO in a ratio by weight of 100:1–100:1–20:1–50.

The above-mentioned remarkable catalytic activity obtained by the addition of CuO may be obtained also by using one or more oxides of such metals as Ge, U, Mn, Ba, Si Se, Au, Co, Sr, Ti, Ag, Mg, B, Sn, W, As and Pb as the catalyst component instead of CuO. Moreover, when using the oxides of Cu, Ge, U, Ba, Sr, Au, Mn, Co, Si, Se, Sn, Ag and Pb very excellent results can be obtained as will be explained later.

The proportion of such metal oxides to be incorporated in the catalyst composition may vary from about 1 to about 50% by weight to the amount of $MoO_3$.

Furthermore, the oxides of metals such as Zn, Bi, Fe and Cd may also be used as a component for the catalyst in the present invention, however, the effects thereof are comparatively weak.

The use of the oxides of such metals as Na, K, Ca, Zr, Sb, Cr, Te, Ni, Pt and Pd is undesirable since the reaction temperature for the reaction system is increased, which results in the reduction in the purity of thus produced acrylic acid.

The catalyst used in the process of this invention has a very suitable activity as the catalyst for producing acrylic acid by the vapor phase oxidation of acrolein. Moreover, the activity is not reduced during the use thereof and the catalyst has a high durability. The catalyst may be prepared very easily, and the cost for the preparation of the catalyst is low.

As the raw material for molybdenum oxide ammonium molybdate ($(NH_4)_6Mo_7O_{24} \cdot 4H_2O$) or other water-soluble molybdate may be used; as the raw material for vanadium oxide ammonium metavanadate ($NH_4VO_3$) or other water-soluble vanadate may be used; as the raw material for aluminum oxide metallic aluminum, aluminum nitrate ($Al(NO_3)_3 \cdot 9H_2O$) and the like may be used; and as the raw material for copper oxide, copper nitrate ($Cu(NO_3)_2 \cdot 3H_2O$), cupric chloride ($CuCl_2$), and the like may be used. Further, as the raw material for germanium oxide, germanium dioxide ($GeO_2$) may be used; as uranium oxide, uranyl nitrate ($UO_2(NO_3)_2 \cdot 6H_2O$) may be used; as manganese oxide, manganese nitrate $$Mn(NO_3)_2 \cdot 6H_2O$$

may be used; as barium oxide, barium nitrate ($Ba(No_3)_2$) may be used; as silica, silica sol may be used; as gold oxide, gold chloride ($AuCl_3 \cdot HCl \cdot 4H_2O$) may be used; as selenium oxide, selenium dioxide ($SeO_2$) may be used; as cobalt oxide, cobalt nitrate ($Co(NO_3)_2 \cdot 6H_2O$) may be used; as titanium oxide, titanium nitrate $$5TiO_2 \cdot N_2O_5 \cdot 6H_2O$$

may be used; as strontium oxide, strontium nitrate ($Sr(NO_3)_2$) may be used; as silver oxide, silver nitrate ($AgNO_3$) may be used; as magnesium oxide, magnesium nitrate ($Mg(NO_3)_2 \cdot 6H_2O$) may be used; as tin oxide, stannous chloride ($SnCl_2 \cdot 2H_2O$) may be used; as tungsten oxide, ammonium tungstate $$5(NH_4)_2O \cdot 12WO_2 \cdot 5H_2O$$

may be used; as boron oxide, boric acid ($H_3BO_3$) may be used; as arsenic oxide, arsenic anhydride ($As_2O_5$) may be used; and as lead oxide, lead nitrate ($Pb(NO_3)_2$) may be used. The raw materials for the metal oxides to be used as a component of the catalyst are not limited to the above described compounds. Various other water-soluble salts of the metals may be employed as these raw materials. Furthermore, in cases where the amount of the metal oxide to be incorporated in the catalyst is small, water-insoluble compounds of the metals such as oxides thereof, may be used. In addition, complex compounds of the metals such as ammonium tin molybdate ($(NH_4)_8Sn(Mo_2O_7)_6 \cdot 20H_2O$) may be used as the raw materials.

When an aluminum sponge is used as the carrier for the catalyst, a small proportion of the aluminum is dissolved off during the preparation of the catalyst, which is very profitable for the practice of the process of this invention. Of course, the aforesaid aluminum compound must be additionally incorporated in the catalyst composition if a catalyst containing a large proportion of $Al_2O_3$ is required.

In the case of using carriers other than aluminum sponge, aluminum or a salt thereof is added as the catalyst component. As the carriers for the catalysts in the present invention may be used aluminum sponge, a pumice stone, silica gel, alumina, silicon carbide, spongy iron, coal cinders, and acid clay. However, most excellent results can be obtained when aluminum sponge is employed. Particularly good results obtained by the use of aluminum sponge (the apparent specific gravity is varied according to the grain size thereof but is about 0.927 when the grain size is 6–10 meshes) result from the fact that excess oxidation does not occur since the surface area thereof is very small (0.2–1.0 m.²/g.) and and the heat of reaction can be easily removed from the system owing to the good heat conductivity thereof. Moreover, a part of the aluminum is dissolved off, thereby reducing the metal salt to be incorporated as the raw material for the metal oxide and hence maintaining the oxygen content in the catalyst as lower oxides. That is, it is considered that the catalyst of the present invention has a specific catalytic activity in a highly reducing state (in an oxygen-deficient state).

It is preferable that the purity of the aluminum sponge to be used in the present invention as a carrier be above 95% but aluminum sponge having a purity of about 90–95% may effectively be used. Further, a sponge aluminum alloy such as Al-Mo alloy may be used in the present invention.

The amount of the metal oxide to be supported on the carrier as the catalyst component is usually 5–50 g. per 100 ml. of the carrier.

In order to prepare the catalyst of this invention, an aqueous solution of the above-mentioned metal salts is applied to the carrier followed by evaporating and drying the resulting mixture to deposit the salts on the carrier (the metal salt after deposition is present as an ammonium salt). The system is then subjected to a pre-treatment designated herein as "1st pre-treatment" in which the metal salt is decomposed by air treatment at about 200–350° C. to control the type of catalyst component. Then the system is subjected to a pre-treatment in which the thus formed catalyst composition is activated by pre-treatment with a gaseous feed (comprising, for example, acrolein, nitrogen, air, steam, and the like) at about 350–450° C., which treatment is designated herein as "2nd pre-treatment."

The oxygen content in the thus prepared catalyst is only ⅓–½ of the value obtained by assuming molybdenum oxides as $MoO_3$, vanadium oxides as $V_2O_5$, aluminum oxides as $Al_2O_3$ and copper oxides as $CuO$. That is, the catalyst of this invention is considered to be composed of lower metal oxides having large oxygen deficiency. Realizing that the oxygen content in a catalyst subjected to an air treatment at a temperature higher than 450° C. is near the theoretical value and that in the latter case the activity of the catalyst is on the contrary reduced, which makes the use of the catalyst unsuitable for the oxidation of acrolein, it can be considered that the lack of the oxygen content in the metal oxides catalysts of this invention as mentioned above, provides a high activity to the catalyst.

The influences of the air treatment temperature in the 1st pre-treatment on the yield for acrylic acid were compared while maintaining the conditions for 2nd pre-treatment constant, the results of which are shown in the following table.

TABLE 2

[Catalyst: $MoO_3:V_2O_5:Al_2O_3:CuO = 100:10:3:10$/Al sponge]

| 1st pre-treatment, °C. | 2nd pre-treatment, °C. | (A), °C. | (B), percent | (C), percent | (D), wt. percent |
|---|---|---|---|---|---|
| 250, 20 hours | 400, 3 hours | 300 | 95 | 77 | 98.0 |
| 300, 20 hours | do | 300 | 98 | 96 | 97.6 |
| 350, 20 hours | do | 300 | 97 | 78 | 94.5 |
| 450, 20 hours | do | 300 | 42 | 17 | 87.2 |

NOTE:
(A) Reaction temperature.
(B) Conversion of acrolein.
(C) Yield for acrylic acid.
(D) Purity of acrylic acid.

Further, while maintaining the 1st pre-treatment conditions constant, the influences of the temperature for 2nd pre-treatment of the yield for acrylic acid were compared, the results of which are shown in Table 3.

TABLE 3

[Catalyst: $MoO_3:V_2O_5=Al_2O_3:CuO=100:10:3:10$/Al sponge]

| 1st pre-treatment, °C. | 2nd pre-treatment, °C. | (A), °C. | (B), percent | (C), percent | (D), wt. percent |
|---|---|---|---|---|---|
| 300, 20 hours | 300, 3 hours | 300 | 61 | 49 | 97.2 |
| Do | 350, 3 hours | 300 | 84 | 70 | 97.0 |
| Do | 400, 3 hours | 300 | 98 | 96 | 97.6 |
| Do | 450, 3 hours | 300 | 98 | 63 | 94.5 |

NOTE:
(A) Reaction temperature.
(B) Conversion of acrolein.
(C) Yield for acrylic acid.
(D) Purity of acrylic acid.

When conducting the catalytic vapor phase oxidation in the process of this invention, air is usually used as an oxidizing agent but oxygen, oxygen-enriched air, or air or oxygen diluted with nitrogen, carbon dioxide or steam may be used. In this case, the reaction can be safely conducted even in the presence of lower saturated or unsaturated hydrocarbons having 3–4 carbon atoms. In any case, the mol ratio of oxygen to one mol of acrolein to be used as the raw material is suitably 0.5–10.0, preferably 0.5–5.0. The use of excess oxygen is undesirable since it promotes the decomposition of once formed acrylic acid and hence reduces the purity of acrylic acid.

The addition of steam is important for smoothly conducting the reaction with a good selectivity. Further, by the addition of steam, a suitable contact time can be selected and the heat of reaction can be effectively removed from the reaction system. The proportion of steam to be added into the system is usually 1–50 mols and preferably 2–20 mols per mol of acrolein to be used as the raw material. However, the use of excess steam is undesirable since although the selectivity for the formation of acrylic acid may be increased, the concentration of acrylic acid in the collected aqueous acid solution is reduced, which makes the purification of the product difficult.

The suitable contact time for carrying out the catalytic reaction is 0.1–10.0 seconds and preferably 0.4–5.0 seconds.

The concentration of acrolein in the gaseous feed may be varied in a wide range but is usually 1–20% by volume, preferably 2–10% by volume.

As acrolein used in this invention, acrolein obtained by conventional methods may be used as well as an acrolein-containing gas prepared by the oxidation of propylene. In the latter case, the presence of unreacted propylene in the gaseous product has no adverse effect on the process of the invention at the reaction temperature.

The reaction temperature is influenced by the mol ratio of oxygen, the concentration of acrolein in the gaseous feed, the space velocity (contact time), and the like but is usually 200–400° C., preferably 250–350° C. A high reaction temperature is undesirable since secondary decomposition, oxidation or polymerization of the acrylic acid promoted, which results in reducing the yield of acrylic acid.

The catalyst in the present invention may be used according to any methods generally employed in such a kind of oxidation, such as, as a fixed bed, a moving bed or a fluidized bed.

The preparation of the catalyst used in the process of the present invention is illustrated as follows: in an evaporation dish was placed 100 ml. of aluminum sponge (02.7 g.) having a grain size of 6–10 meshes and then an aqueous warm solution containing 22.45 g. of ammonium molybdate, 2.36 g. of ammonium metavanadate and 5.25 g. of copper nitrate was added thereto in one increment. The mixture was then heated on a water bath while stirring to evaporate water and deposit the catalyst components on the aluminum sponge. After drying the mixture at 100–120° C., it was charged in a reaction tube (made of a steel pipe having 16.5 mm. in inside diameter and 115 cm. in length; heated through a niter bath by means of two micron wires of 1 kw.) and while passing air through the reaction tube in a flow rate of 1 liter/min., the system was treated for about 3–20 hours at 200–350° C. (1st pretreatment). After the end of the air treatment, the product was withdrawn from the reaction tube and sieved to provide the desired catalyst. In this case, the above defined treating temperature in the presence of air (or passing of air) is important. If the system was treated at a higher temperature (for example at 450°), the activity of the thus prepared catalyst would be reduced and the catalyst unsuitable for the production of acrylic acid.

A sufficient amount of thus prepared mixture was charged again in the reaction tube and while passing through the catalyst a gaseous feed, the catalyst was treated for 1–5 hours at 350–450° C. (2nd treatment). A catalyst containing $MoO_3$, $V_2O_5$, $Al_2O_3$ and $CuO$ in a ratio of 100:10:3:10 was obtained. In this case, the 1st pretreatment and 2nd pretreatment may be conducted continuously. A catalyst having a proper activity for the production of acrylic acid was obtained. However, in the 2nd pre-treatment, if the treating temperature with a gaseous feed was too low, e.g., 300–350° C. the activity of the thus obtained catalyst would have been insufficient and the yield for acrylic acid reduced.

The oxidation of acrolein by using thus prepared catalyst may be carried out as follows: After the end of 2nd pre-treatment, the reaction temperature was reduced to a desired level while passing the gaseous feed, and thereafter the oxidation was started.

The gaseous feed may be prepared by various methods and may be introduced into the system by various methods. For example, a small proportion of a nitrogen gas was introduced into an evaporation apparatus for acrolein to entrain the acrolein vapor after being mixed with air or oxygen, the mixture was introduced into the reaction tube from the upper part thereof. A desired amount of water is introduced by means of a stroke pump into an evaporator wherein the water was evaporated immediately, and the thus formed steam was introduced into the reaction tube from the upper part thereof, where it was uniformly mixed with the above-mentioned gaseous feed of acrolein, nitrogen and air. Thereafter the gaseous feed was passed through the catalyst layer in the reaction tube. The reaction product gases passed through the catalyst layer were introduced into an ice-cooled flask, whereby acrylic acid was completely recovered from the reaction product gases as an aqueous solution thereof.

The yield for the thus formed acrylic acid was determined by using a gas chromatograph (GCIA type apparatus made by Shimadzu Seisakusho, behenic acid di-2-ethylhexyl sebacate: 0.75 m. column, helium: 100 ml./min., temperature: 130° C., and inside standard material: methacrylic acid).

The quantitative analysis of unreacted acrolein in the aqueous solution was conducted by gas chromatography (GCIB type apparatus made by Shimadzu Seisakusho, polyethylene glycol: 1000–1.5 m., column, nitrogen 50 ml./min., temperature: 80° C., hydrogen flame ionization detector; inside standard material: isopropanol). The acrolein present in the waste gases was determined by a precipitation and weighing method with a 2 N HCl saturated solution of 2,4-dinitrophenyl hydrazine.

In addition, the conversion of acrolein used as the raw material, the yield for acrylic acid, and the purity of acrylic acid are determined according to the following equations:

Conversion (percent)

$$= \frac{\text{Weight of fed acrolein} - \text{weight of unreacted acrolein}}{\text{Weight of fed acrolein}} \times 100$$

Yield (percent)

$$= \frac{\text{Weight of carbon of formed acrylic acid}}{\text{Weight of carbon of fed acrolein}} \times 100$$

Purity of acrylic acid (wt. percent)

$$= \frac{\text{Weight of formed acrylic acid}}{\text{Weight of formed acrylic acid} + \text{Weight of by-produced acetic aid}} \times 100$$

EXAMPLE 1

In an evaporating dish was charged 92.7 g. (100 ml.) of aluminum sponge of 6–10 meshes and then an aqueous warm water containing 22.45 g. of ammonium molybdate, 2.36 g. of ammonium metavanadate, and 5.52 g. of copper nitrate was added thereto in one increment and the system was heated on a water bath while stirring to evaporate water and deposit the metal salts on the aluminum sponge. After drying the system at 120° C., it was charged in a reaction tube, wherein the system was treated by introducing air into the reaction tube from the upper part thereof at a rate of one liter/min. Then, the temperature was increased gradually to 285° C., when the introduction of air was stopped, the system was allowed to cool and thus air treated mixture was withdrawn from the reaction tube and sieved into fine particles by means of a 10-mesh sieve. Thereafter, 50 ml. of the thus treated mixture was charged again in the reaction tube and heated therein by increasing the column temperature. When the temperature inside the tube reached to 300° C., a gaseous feed (concentration of acrolein: 3.2% by volume, mol ratio of oxygen to acrolein: 2.4, mol ratio of water to acrolein: 15.0, and space velocity: 1230 hr.$^{-1}$) was introduced into the reaction tube. The temperature of the system was increased again and when it reached 400° C., the mixture was treated for 3 hours at the same temperature. The thus prepared catalyst contained the metal oxides of $MoO_3$, $V_2O_5$, $Al_2O_3$, and CuO in a weight ratio of 100:10:3:10.

Immediately after the end of this treatment for the catalyst in the reaction tube, the composition of the gaseous feed was changed to 4.0% by volume of acrolein, 1.5 mol ratio of oxygen to acrolein, and 10.0 mol ratio of water to acrolein. The space velocity was changed to 1000 hr.$^{-1}$, and liquid products were separated and analyzed while decreasing the reaction temperature. The relation between the reaction temperature and the yield for acrylic acid is shown in the following table.

TABLE 4

| | Conversion of acrolein, percent | Yield for acrylic acid, percent | Purity of acrylic acid, percent |
|---|---|---|---|
| Temperature: | | | |
| 350 | 99.9 | 91.1 | 95.2 |
| 325 | 99.8 | 95.7 | 97.3 |
| 300 | 98.4 | 96.0 | 97.6 |
| 275 | 92.7 | 90.1 | 98.5 |

EXAMPLE 2

By using the same catalyst as in Example 1, the influence of the content of oxygen on the yield for acrylic acid and the purity of acrylic acid was measured at a reaction temperature of 300° C., while varying the mol ratio of oxygen to acrolein in the gaseous feed as in Example 1 to 0.6–5.0, the results of which are shown in Table 5.

TABLE 5

| | Conversion of acrolein, percent | Yield for acrylic acid, percent | Purity of acrylic acid, percent |
|---|---|---|---|
| Oxygen/acrolein, mol ratio: | | | |
| 5.0 | 99.9 | 93.2 | 95.1 |
| 3.0 | 99.6 | 95.9 | 97.2 |
| 1.5 | 98.4 | 96.0 | 97.6 |
| 0.6 | 88.1 | 86.8 | 98.6 |

EXAMPLE 3

By using the same catalyst as in Example 1, the influence of the content of steam on the yield and the purity of acrylic acid was measured at a temperature of 300° C., while varying the mol ratio of water to acrolein in the gaseous feed as in Example 1 to 0–30.0, the results of which are shown in the following table.

TABLE 6

| | Conversion of acrolein, percent | Yield for acrylic acid, percent | Purity of acrylic acid, percent |
|---|---|---|---|
| Water/acrolein, mol ratio: | | | |
| 30 | 96.8 | 94.8 | 98.1 |
| 10 | 98.4 | 96.0 | 97.6 |
| 2 | 99.3 | 92.2 | 97.0 |
| 0 | 85.9 | 70.0 | 88.4 |

Example 4

By using the same catalyst as in Example 1, the influence of the space velocity on the yield and the purity of acrylic acid was measured at a temperature of 300° C., while varying the space velocity of the gaseous feed having the same composition as in Example 1 to 500–2000 hr.$^{-1}$, the results of which are shown in the following table.

TABLE 7

| | Conversion of acrolein, percent | Yield for acrylic acid, percent | Purity of acrylic acid, percent |
|---|---|---|---|
| Space velocity, hr.$^{-1}$: | | | |
| 500 | 100.0 | 97.5 | 97.0 |
| 1,000 | 98.4 | 96.0 | 97.6 |
| 2,000 | 91.1 | 89.5 | 98.3 |

Example 5

A catalyst containing $MoO_3$, $V_2O_5$, and $GeO_2$ in a ratio of 100:10:3:10 was prepared by the method same as in Example 1. The oxidation of acrolein was conducted at a temperature of 300° C., by passing through the layer of thus prepared catalyst a gaseous feed containing 8.0% by volume of acrolein and of 2.0 in mol ratio of oxygen to acrolein and 6.0 in mol ratio of water to acrolein at a space velocity of 800 hr.$^{-1}$. As the results thereof, the conversion of acrolein was 99.3%, the yield for acrylic acid 96.2% and the purity of acrylic acid 98.6%.

Example 6

By using the catalyst same as in Example 5, a reaction product gas is obtained by the oxidation of propylene (containing acrolein and unreacted propylene) were oxidized. The concentration of acrolein, the concentration of propylene, the mol ratio of oxygen to acrolein and the mol ratio of water to acrolein were 4.0% by volume, 1.3% by volume, 1.5 and 10.0 respectively. The gaseous feed was passed through the catalyst layer at a temperature of 300° C. and a space velocity of 1000 hr.$^{-1}$.

The conversion of acrolein was 99.0%, the yield for acrylic acid 96.0% and the purity of acrylic acid 98.5%. In this case, the propylene was not consumed.

Example 7

A catalyst containing $MoO_3$, $V_2O_5$, $Al_2O_3$ and $UO_3$ in a ratio of 100:10:3:10 was prepared by the procedure almost the same as in Example 1. A gaseous feed containing 4.0% by volume of acrolein and having 1.5 in mol ratio of oxygen to acrolein and 10.0 in mol ratio of water to acrolein was passed through the catalyst layer at a temperature of 300° C. and at a space velocity of 1000 hr.$^{-1}$. This procedure was continued for 45 days. The results are as follows: The conversion of acrolein was 95.9%, the yield for acrylic acid 93.1% and the purity of acrylic acid 98.5%.

Examples 8–23

Various catalysts containing $MnO_2$, BaO, $SiO_2$, $Au_2O_3$, $SeO_2$, CoO, SrO, $CuO-GeO_2$, $Ag_2O$, MgO, SnO, $TiO_2$, $B_2O_3$, $WO_3$, $As_2O_5$, and PbO respectively were prepared as the procedure almost same as in Example 1. By using thus prepared catalysts, the oxidation of acrolein was conducted under the same conditions as in Example 7. The results are shown in Table 8.

TABLE 8

| Example No. | Composition | Compounding weight ratio | (A) | (B) | (C) | (D) |
|---|---|---|---|---|---|---|
| 8 | $MoO_3:V_2O_5:Al_2O_3:MnO_2$ | 100:10:3:10 | 300 | 97.7 | 92.0 | 97.9 |
| 9 | $MoO_3:V_2O_5:Al_2O_3:BaO$ | 100:10:3:10 | 300 | 97.8 | 93.1 | 96.9 |
| 10 | $MoO_3:V_2O_5:Al_2O_3:SiO_2$ | 100:10:3:10 | 300 | 97.7 | 92.4 | 97.7 |
| 11 | $MoO_3:V_2O_5:Al_2O_3:Au_2O_3$ | 100:10:10:1 | 300 | 95.8 | 92.0 | 97.8 |
| 12 | $MoO_3:V_2O_5:Al_2O_3:SeO_2$ | 100:10:10:1 | 300 | 95.4 | 90.6 | 97.8 |
| 13 | $MoO_3:V_2O_5:Al_2O_3:CoO$ | 100:50:3:50 | 300 | 97.2 | 90.5 | 97.3 |
| 14 | $MoO_3:V_2O_5:Al_2O_3:SrO$ | 100:25:5:5 | 300 | 99.5 | 95.6 | 98.0 |
| 15 | $MoO_3:V_2O_5:Al_2O_3:CuO:GeO_2$ | 100:10:3:20:10 | 300 | 97.9 | 94.3 | 97.5 |
| 16 | $MoO_3:V_2O_5:Al_2O_3:Ag_2O$ | 100:10:3:3 | 300 | 95.1 | 90.2 | 96.5 |
| 17 | $MoO_3:V_2O_5:Al_2O_3:MgO$ | 100:10:3:3 | 300 | 92.2 | 87.8 | 96.0 |
| 18 | $MoO_3:V_2O_5:Al_2O_3:SnO$ | 100:10:3:10 | 300 | 91.1 | 88.0 | 97.4 |
| 19 | $MoO_3:V_2O_5:Al_2O_3:TiO_2$ | 100:10:5:20 | 300 | 95.0 | 87.0 | 96.7 |
| 20 | $MoO_3:V_2O_5:Al_2O_3:B_2O_3$ | 100:10:3:5 | 300 | 94.8 | 87.4 | 98.0 |
| 21 | $MoO_3:V_2O_5:Al_2O_3:WO_3$ | 100:10:3:10 | 300 | 91.9 | 86.1 | 97.0 |
| 22 | $MoO_3:V_2O_5:Al_2O_3:As_2O_5$ | 100:10:3:2 | 300 | 97.7 | 87.2 | 96.1 |
| 23 | $MoO_3:V_2O_5:Al_2O_3:PbO$ | 100:10:5:20 | 300 | 93.3 | 88.7 | 96.0 |

NOTE:
(A) Temperature, ° C.
(B) Conversion of acrolein, percent.
(C) Yield for acrylic acid, percent.
(D) Purity of acrylic acid, percent.

Example 24

A catalyst containing $MoO_3$, $V_2O_5$, $Al_2O_3$, and $Au_2O_3$ in a ratio of 100:20:3:5 was prepared by the procedure the same as in Example 1. In this case, however, silica gel (S-50A made by Dokai Chemical Co.; apparent specific gravity 0.544, and size 6-10 meshes) was used as the carrier.

A gaseous feed having 2.5% by volume in concentration of acrolein, 1.0 in mol ratio of oxygen to acrolein and 5.0 in mol ratio of water to acrolein was passed through the catalyst layer at a temperature of 280° C. and at a space velocity of 2000 hr.$^{-1}$. The results are as follows: The conversion of acrolein was 94.5%, the yield for acrylic acid 81.4% and the purity of acrylic acid 95.1%.

Example 25

A catalyst containing $MoO_3$, $V_2O_5$, $Al_2O_3$, $GeO_2$, and $Au_2O_3$ in a ratio of 100:20:2:5:5 was prepared by the procedure the same as in Example 1. In this case, however, silica sol (Snow Tex No. 3 made by Nissan Chemical Co.; concentration 30%) was used as the carrier and after drying by evaporation, the mixture of the metal salts and the silica gel was molded by compressing. By using the same gaseous feed as in Example 24 and under the same reaction conditions as in the same example, the oxidation was carried out. The results are as follows: The conversion of acrolein was 96.2%, the yield for acrylic acid 83.1% and the purity of acrylic acid 95.8%.

What is claimed is:

1. A process for the production of acrylic acid which comprises subjecting acrolein to vapor phase oxidation with molecular oxygen using as a catalyst a catalytic complex consisting essentially of molybdenum, vanadium, aluminum, oxygen and one or two members selected from the group consisting of copper, germanium, uranium, manganese, barium, silicon, gold, selenium, cobalt, titanium, strontium, silver, magnesium, boron, tin, tungsten, lead and arsenic, wherein said catalytic complex constitutes a complex oxide of said metals in a ratio of 100:1–100:1–20 as $MoO_3:V_2O_5:Al_2O_3$, and said copper, germanium, uranium, manganese, barium, silicon, gold, selenium, cobalt, titanium, strontium, silver, magnesium, boron, tin, tungsten, lead and arsenic are present as oxide in an amount of 1–50 parts by weight to 100 parts by weight of $MoO_3$.

2. The process for the production of acrylic acid as claimed in claim 1, wherein said molecular oxygen is supplied to the reaction system as a gas selected from the group consisting of oxygen gas and those diluted with a member selected from the group consisting of steam, carbon dioxide and nitrogen.

3. The process for the production of acrylic acid as claimed in claim 1, wherein said vapor phase oxidation is carried out in the presence of steam as a diluent.

4. The process for the production of acrylic acid as claimed in claim 1, wherein said vapor phase oxidation is carried out in the presence of lower saturated and unsaturated hydrocarbons having from 3 to 4 carbon atoms as a diluent.

5. The process for the production of acrylic acid as claimed in claim 1, wherein said vapor phase oxidation is carried out at a temperature of from 200 to 400° C., using a gaseous feed containing from 1 to 20% by volume of acrolein and having from 0.5 to 10.0 in mol ratio of oxygen to acrolein and from 1 to 50 in mol ratio of water to acrolein.

6. The process for the production of acrylic acid as claimed in claim 1, wherein catalyst composition is supported on a carrier selected from the group consisting of aluminum sponge and silica gel.

7. A process for the production of acrylic acid as in claim 1, wherein said catalyst is prepared by immersing a carrier in an aqueous solution of the metal salts derived from the metals which constitute said catalyst, pretreating said catalyst with air at a temperature of from about 200 to about 350° C., and then finishing said treatment with a gaseous feed comprising acrolein, oxygen and inert gases at a temperature of from about 350° C. to about 450° C.

8. The process as claimed in claim 1 wherein said acrolein is an acrolein-containing gas obtained by the catalytic oxidation of propylene.

References Cited

UNITED STATES PATENTS 3,439,028    4/1969    Yanagita et al. _____ 260—530U

LORRAINE A. WEINBERGER, Primary Examiner

R. D. KELLY, Assistant Examiner

U.S. Cl. X.R.

252—432, 455, 464